Dec. 9, 1969 J. C. PINSON 3,483,384
OPTICAL MONITOR MECHANIZATION FOR
MINIMIZING GUIDANCE SYSTEM ERRORS
Filed July 6, 1965 3 Sheets-Sheet 1

INVENTOR.
JOHN C. PINSON
BY
ATTORNEY

INVENTOR.
JOHN C. PINSON
ATTORNEY

United States Patent Office 3,483,384
Patented Dec. 9, 1969

3,483,384
OPTICAL MONITOR MECHANIZATION FOR MINIMIZING GUIDANCE SYSTEM ERRORS
John C. Pinson, Anaheim, Calif., assignor to North American Rockwell Corporation
Filed July 6, 1965, Ser. No. 469,765
Int. Cl. G01j 1/20
U.S. Cl. 250—203                                    7 Claims

ABSTRACT OF THE DISCLOSURE

A means and method of pointing an optical monitor which provides position error signals to an inertial guidance system mounted within a missile wherein the telescope of the optical monitor is pointed at a known star in a manner so as to minimize missile impact position errors. The telescope is aligned along a line of sight to the known star by first rotating it about an axis which is substantially along the cutoff velocity vector of the ballistic missile and secondly rotating it about an axis perpendicular to the first mentioned axis.

---

This invention pertains to an optical monitor which provides position error signals to an inertial guidance system mounted within a missile and more particularly to a means and method of pointing the telescope of an optical monitor or of processing information obtained from an optical monitor so as to minimize missile position errors.

Consider a ballistic missile with an inertial guidance system operating under the following conditions. At the time that the missile is launched, all of the necessary initial conditions are known to acceptable accuracy except for the inertial platform azimuth orientation, that is, the platform initial orientation about the launch point local vertical axis. An optical monitor is mounted on the platform for the purpose of making a star sighting after launch, during boost, in order to determine the platform azimuth orientation. A photodetector is mounted in the optical monitor telescope focal plane. The photodetector field-of-view in monitor elevation is large enough so that only coarse non-precision, telescope positioning in elevation is required. The photodetector field-of-view in monitor azimuth is much more restricted and the telescope azimuth pointing angle required to see the star can be read precisely. The problem is to devise a mechanization that makes use of this optical monitor in such a way as to minimize the target miss error of the ballistic missile.

It is, therefore, an object of this invention to provide an improved means and method of mounting and pointing the telescope of an optical monitor.

A further object of this invention is to provide a telescope means and method which substantially reduces the alignment errors in an inertial guidance system.

Another object of this invention is to provide a method for accurately determining the azimuth misalignment of an inertial platform.

Another object of this invention is to provide an improved means of pointing an optical monitor telescope having a large field-of-view in elevation and a narrow field of view in azimuth.

Another object of this invention is to provide a method of processing the information read from the telescope of an optical monitor however it may be mounted and pointed.

These and other objects of this invention will be more fully understood when taken in conjunction with the following description and drawings in which.

Figure 1:
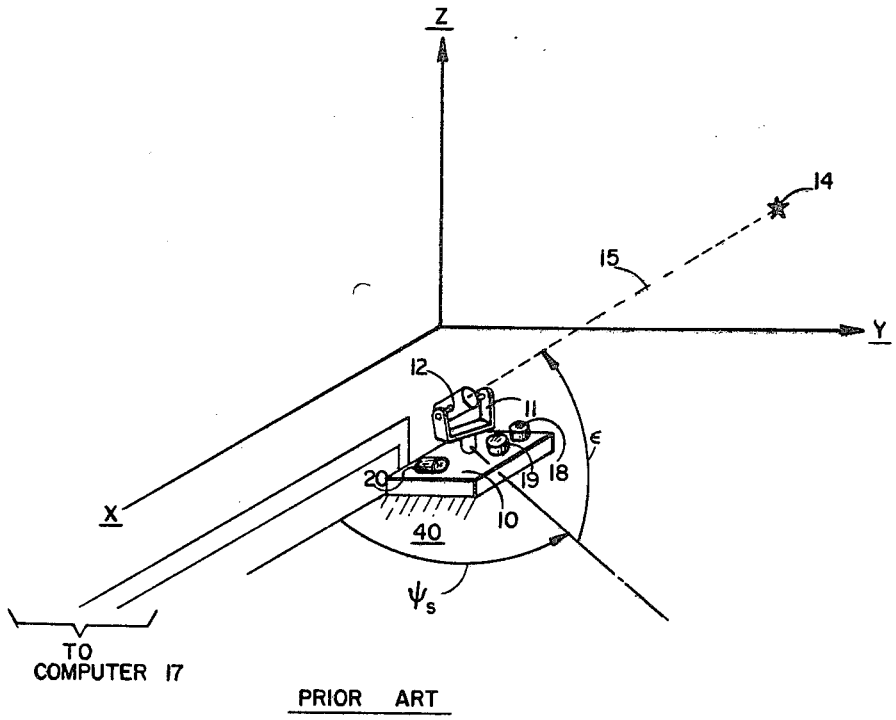
FIG. 1 illustrates the prior art method of pointing an optical monitor telescope.

Referring to FIG. 1 wherein the prior art means of mounting the optical monitor to the inertial platform is shown: The telescope 12 is rotatably supported by a U-type frame 11 which provides the telescope with a first degree-of-angular freedom with respect to the platform 10. The frame is rotatably supported on the platform and provides the telescope with a second degree-of-angular freedom about the z platform axis. The platform 10 in turn is mounted to the vehicle 40. For an example of such a mounting, see U.S. Patent No. 2,949,030, entitled, "Gyroscopically Stabilized Optical System Platform," by R. B. Horsfall, Jr. et al., assigned to North American Aviation, Inc. (now North American Rockwell Corp.), the assignee of the present invention. Prior to launching the missile 40, platform 10 is aligned with the z-axis parallel to the direction of local gravity and the x-axis downrange. During missile boost, the platform is maintained in an orientation that is non-rotating with respect to inertial space.

The straightforward optical monitor mechanization is one in which the telescope line of sight 15 is rotated from the platform x-axis, first around in azimuth by $\psi'_s$ then up in elevation by $\epsilon$ in order to see the star 14. The optical monitor makes a precise measurement of $\psi'_s$, but not of $\epsilon$. The platform azimuth misalignment is determined by noting the difference between $\psi'_s$ and $\psi_s$, where $\psi_s$ is read from an ephemeris and is that rotation required to see the star when there is no platform azimuth misalignment. Having made this measurment of $\psi'_s - \psi_s$ and stored it in the on-board guidance computer 17, illustrated in block form in FIG. 3, the existing platform orientation is known. Thus the reference frame in which the platform mounted accelerometers (not shown) are measuring acceleration is known and the missile can be guided to impact on the desired target.

The optical monitor makes the star sighting and platform azimuth correction after the missile has left the sensible atmosphere, about midway in the missile boost phase. At the time of the star sighting there exist platform angular orientation misalignments about all three of the platform axes: $\phi_x$ about the x-axis, $\phi_y$ about the y-axis, and $\phi_z$ about the z-axis. $\phi_y$ is large (order of 1 deg.) and $\phi_x$ and $\phi_y$ are much smaller. Now considering all three components of platform misalignment, $\psi'_s$ is given by $$\psi'_s = \psi_s - \phi_z + \phi_x \tan \epsilon \cos \psi_s + \phi_y \tan \epsilon \sin \psi_s \quad (1)$$

The computed azimuth correction, $\phi_{zc}$, is $$\phi_{zc} = \psi_s - \psi'_s = \phi_z - \phi_x \tan \epsilon \cos \psi_s - \phi_y \tan \epsilon \sin \psi_s \quad (2)$$

The error in computing the azimuth correction, $\Delta\phi_z$, is $$\Delta\phi_z = \phi_{zc} - \phi_z = -\phi_x \tan \epsilon \cos \psi_s - \phi_y \tan \epsilon \sin \psi_s \quad (3)$$

Thus this stellar monitor mechanization allows the azimuth misalignment, $\phi_z$, existing at the time of the star fix, to be completely corrected, but introduces errors in the correction due to misalignments about x and y, $\phi_x$ and $\phi_y$. The relationship between $\Delta\phi_z$ and $\phi_x$ and $\phi_y$ depends upon the direction of the line of sight to the star, as indicated by the above equation.

The total vector platform misalignment after application of the azimuth correction computed from the star sighting is $$\Delta\bar{\phi} = \bar{1}_x \phi_x + \bar{1}_y \phi_y + \bar{1}_z (-\phi_x \tan \epsilon \cos \psi_s - \phi_y \tan \epsilon \sin \psi_s) \quad (4)$$

In order to understand the disadvantage of the conventional mechanization just described, it is necessary to understand something about the propagation of platform misalinement errors into target miss errors. The equations governing the propagation of misalinements into missile cutoff errors are $$\left[\frac{d}{dt}\overline{\delta V}\right]_I = -\overline{\phi} x \overline{A} \quad (5)$$

and $$\left[\frac{d^2}{dt^2}\overline{\delta R}\right]_I = -\overline{\phi} x \overline{A} \quad (6)$$

where $\overline{\delta V}$ and $\overline{\delta R}$ are the missile velocity and position error vectors, during boost, the derivatives are as viewed from inertial space, $\overline{A}$ is the rocket thrust vector and $\phi$ is the platform angular misalignment vector.

$$\overline{\phi} = \overline{1}_x \phi_x + \overline{1}_y \phi_y + \overline{1}_z \phi_z \quad (7)$$

Solutions of the above differential equations for velocity and position errors at cutoff are $$\overline{\delta V} = -\int_0^{t_{co}} dt \overline{\phi} x \overline{A} \quad (8)$$

$$\overline{\delta R} = -\int_0^{t_{co}} dt \int_0^t dt \overline{\phi} x \overline{A} \quad (9)$$

where $t_{co}$ is the time of missile cutoff and the operation indicated by the integrals is integration of components of the vector integrand on some inertially fixed set of axes.

If $\overline{\phi}$ is a constant, it can be moved outside the integral and the expressions above become $$\overline{\delta V} = -\overline{\phi} x \int_0^{t_{co}} dt \overline{A} \quad (10)$$

$$\overline{\delta R} = -\overline{\phi} x \int_0^{t_{co}} dt \int_0^t dt \overline{A} \quad (11)$$

For an ICBM the vector $$\int_0^{t_{co}} dt \overline{A}$$

is in the trajectory plane and down from the z-axis by roughly 60 degrees. The vector $$\int_0^{t_{co}} dt \int_0^t dt \overline{A}$$

lies along the vector $$\int_0^{t_{co}} dt \overline{A}$$

it is pointed up higher by a few degrees.

If $\overline{\phi}$ points in the same direction as $$\int_0^{t_{co}} dt \overline{A}$$

and $$\int_0^{t_{co}} dt \int_0^t dt \overline{A}, \overline{\delta V} \text{ and } \overline{\delta R}$$

are small and almost no target error impact results. Not only do the vectors $$\int_0^{t_{co}} dt \overline{A} \text{ and } \int_0^{t_{co}} dt \int_0^t dt \overline{A}$$

point in very nearly the same direction, but also the vector $\overline{A(t)}$ points in approximately that same direction during most of the missile boost. This means that missile target error is relatively insensitive not only to vector platform misalignments that are in the direction of $$\int_0^{t_{co}} dt \overline{A}$$

and constant but also to ones whose magnitude varies with time but whose direction is always along $$\int_0^{t_{co}} dt \overline{A}$$

The guidance system platform of FIG. 1 may be stabilized by three single-degree-of-freedom gyroscopes 18, 19 and 20 or two two-degree-of-freedom gyros. Such operation is well known to persons skilled in the art and as such the gyroscopes themselves are not illustrated, as they form no part of the present invention. A relatively large amount of target error is potentially due to the uncertainty in the magnitude of the acceleration sensitive drift rates of the gyros. These are drift rates which are proportional to acceleration along some axis, or proportional to the product of acceleration components along two orthogonal axes (commonly called $g$ and $g^2$ dependent drift rates). The system designer has a great deal of freedom as to how these gyros are oriented with respect to the platform $x$, $y$, $z$ axes. The target errors due to the uncertainties in the $g$ and $g^2$ dependent drift rates can be reduced substantially by optimizing the gyro orientation. With this optimum gyro orientation the drift rate uncertainties are made small about all axes but one; there remains a relatively large $g$-sensitive drift rate uncertainty about an axis that is in the platform $x$–$z$ plane (thus in the missile orbit plane) and within a few degrees of the $$\int_0^{t_{co}} \overline{A} dt$$

vector. This, of course, is that axis about which platform rotations cause very little target miss. The uncertainty in accumulated platform rotation about this axis is an order of magnitude larger than the rotation uncertainty about axes normal to this one. In a sense, the result of the gyro orientation optimization is to place those $g$ and $g^2$ sensitive drift rates that cannot be greatly attenuated or eliminated altogether along the axis where their effects are small. Another way of stating this is to say that the optimum gyro orientation is the one that virtually eliminates the $g^2$ drifts and makes the major $g$ induced platform misalignment occur on the $x$ and $z$ axes correlated in such a way that the total misalignment lies along an axis roughly parallel to the axis of $$\int_0^{t_{co}} dt \overline{A}$$

The azimuth correction error equation resulting from the straight-forward mechanization is given by Equation 3. The azimuth error, $\phi_z$, that exists just before the time of the star sighting is completely eliminated, but errors due to misalignments about the other two axes, $\phi_x$ and $\phi_y$, are inroduced. The desirable correlation of the $g$-sensitive portions of $\phi_x$ and $\phi_z$ that existed with optimum gyro orientation is lost when the azimuth correction following the star sighting is made. Thus the straightforward optical monitor mechanization shown in FIG. 1 does indeed permit computation of and correction for the azimuth misalignment existing at missile launch. However, by destroying the correlation between $g$-sensitive components of $\phi_x$ and $\phi_z$, the missile impact accuracy improvement that can be achieved by optimum gyro orientation is greatly reduced. The result is that use of the straightforward optical monitor leads to unaccepable missile impact errors due to gyro $g$-sensitive drift rates.

Figure 2:
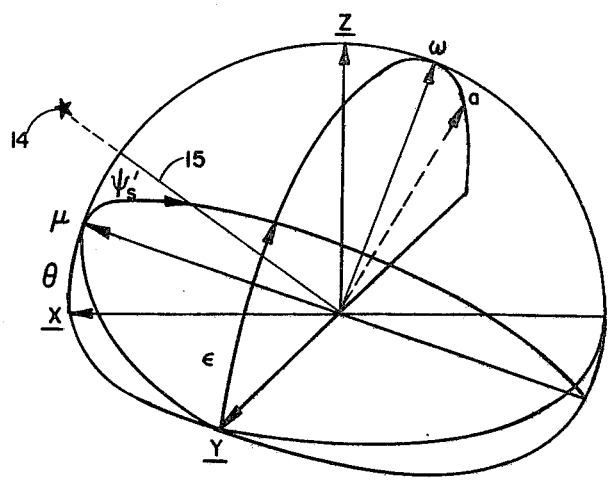
FIG. 2 illustrates in vector notation form the method of this invention.

By altering the gimballing arrangement of the stellar monitor, the objective of correcting for prelaunch azimuth error can be realized without incurring the $g$-sensitive gyro drift rate induced impact errors that arise when the conventional mechanization is used. The name "improved mechanization" will be used here to indicate this altered gimballing arrangement. As before, the stellar monitor is a telescope with a photodetector mounted in the focal plane that is long in the $\epsilon$ direction and narrow in the $\psi_s$ direction. Referring now to FIG. 2, the improved mechanization illustrated in vector form has the telescope line of sight first rotated by $\epsilon$ around an axis, $\mu$, that is in the $x$–$z$ plane up from the $x$-axis by an angle $\theta$ and then second rotated by $\psi'_s$ about an axis $a$ that is rotated from the $w$ axis by the angle $\epsilon$ about the $\mu$ axis. The stellar monitor arrangement described here is a simple, mechanical, way of producing a measurement of the angle $\psi'_s$ of FIG. 2. However, the value of $\psi'_s$ can be computed from a measurement of any set of two angles describing the rotation of the star line of sight from the platform axes. It is intended here that the term "improved mechanization" apply to any mechanization that makes use of the angle $\psi'_s$ of FIG. 2 in computing an azimuth correction, whether measured directly, as with the stellar monitor arrangement described above, or computed from another set of measured angles. The angle $\theta$ is chosen so that the $\mu$ axis lies very nearly in the direction of $$\int_0^{t_{co}} dt\overline{A}$$

The platform misalignment at the time of the star sighting can be expressed as a set of misalignment angles, $\phi_x$, $\phi_y$, $\phi_z$ about the $x$, $y$, $z$ set of axes or, alternatively, as a set of misalignment angles $\phi_\mu$, $\phi_y$, $\phi_w$ about the $\mu$, $y$, $w$ set of axes, with $$\phi_\mu = \phi_x \cos\theta + \phi_z \sin\theta \quad (12)$$

$$\phi_w = -\phi_x \sin\theta + \phi_z \cos\theta \quad (13)$$

The angle that the stellar monitor measures in acquiring the star is $$\psi'_s = \psi_s + \phi_y \sin\epsilon - \phi_w \cos\epsilon \quad (14)$$

where $\psi_s$ is the precomputed angle the star tracker would have to turn about $a$ to point to the start if there were no platform misalignments.

Note that the measured angle to the star, $\psi'_s$, is not a function of the component of platform misalignment about the $\mu$ axis, $\phi_\mu$. Thus the platform misalignments that accumulate during flight due to $g$-sensitive gyro drifts with optimum gyro orientation do not affect the measurement.

Substituting Equation 13 into Equation 14

$$\psi'_s = \psi_s + \phi_x \sin\theta \cos\epsilon + \phi_y \sin\epsilon - \phi_z \cos\theta \cos\epsilon$$

The azimuth correction is computed by $$\phi_{zc} = \frac{\psi_s - \psi'_s}{\cos\theta \cos\epsilon} \quad (15)$$

In terms of the platform misalignments existing at the time of the star sighting, $\phi_{zc}$ is given by $$\phi_{zc} = -\phi_x \tan\theta - \phi_y \frac{\tan\epsilon}{\cos\theta} + \phi_z \quad (16)$$

The azimuth error that exists after the computed correction $\phi_{zc}$ has been taken out is $\Delta\phi_z$, where $$\Delta\phi_z = \phi_z - \phi_{zc} = +\phi_x \tan\theta + \phi_y \frac{\tan\epsilon}{\cos\theta} \quad (17)$$

The total vector platform misalignment after the application of the azimuth correction computed from the star sighting is $$\Delta\overline{\phi} = \overline{1}_x \phi_x + \overline{1}_y \phi_y + \overline{1}_z \Delta\phi_z$$

$$= \phi_x \frac{1}{\cos\theta}(\overline{1}_x \cos\theta + \overline{1}_z \sin\theta) + \overline{1}_y \phi_y + \overline{1}_z \phi_y \frac{\tan\epsilon}{\cos\theta}$$

$$= \overline{1}_\mu \phi_x \frac{1}{\cos\theta} + \overline{1}_y \phi_y + \overline{1}_z \phi_y \frac{\tan\epsilon}{\cos\theta} \quad (18)$$

Figure 4:
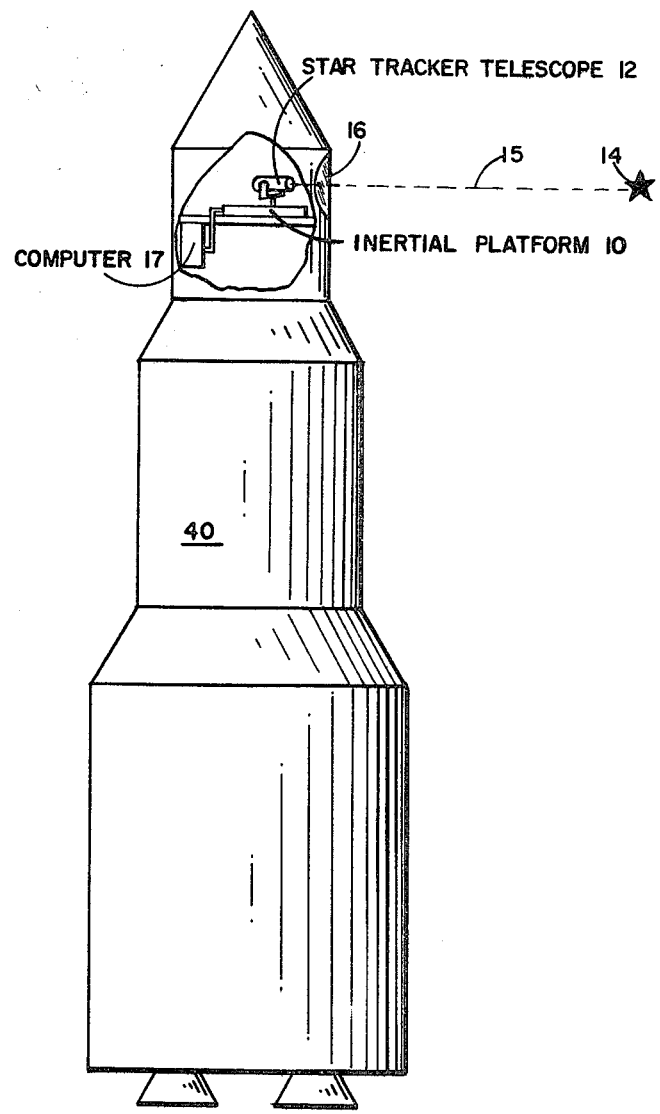
FIG. 4 is a partial sectional view of the optical monitor mounted within a missile type vehicle.

Some discussion of Equation 18 is necessary in order to be sure its interpretation is clear. Equation 18 gives the post-star-correction platform misalignment error, $\overline{\Delta\phi}$, in terms of pre-star-correction misalignment errors, $\phi_x$, $\phi_y$ and $\phi_z$. Note that $\overline{\Delta\phi}$ is independent of $\phi_z$. Since the angular correction following the star shot is applied only about the $z$ axis, $\Delta\phi_x = \phi_x$ and $\Delta\phi_y = \phi_y$, of course. But $\phi_x$ propagates into $\Delta\phi_z$ in such a way as to make the vector sum of the $x$-axis misalignment and that part of the corrected $z$-axis misalignment due to $\phi_x$ lie along the $\mu$-axis. Platform misalignments about the $\mu$-axis propagate into relatively little missile target miss errors. For most of the stars that can be seen out of the missile window 16 (ref. FIG. 4), a tilt about the $y$ axis, $\phi_y$, leads to a somewhat larger post-correction azimuth error with this improved mechanization than with the straightforward mechanization. However, because $\phi_y$ is small compared to $\phi_x$ at the time of the star sighting the resulting small increase in target error is insignificant compared to the reduction that is achieved by forcing the correlation of $x$ and $z$ platform errors.

Figure 3:
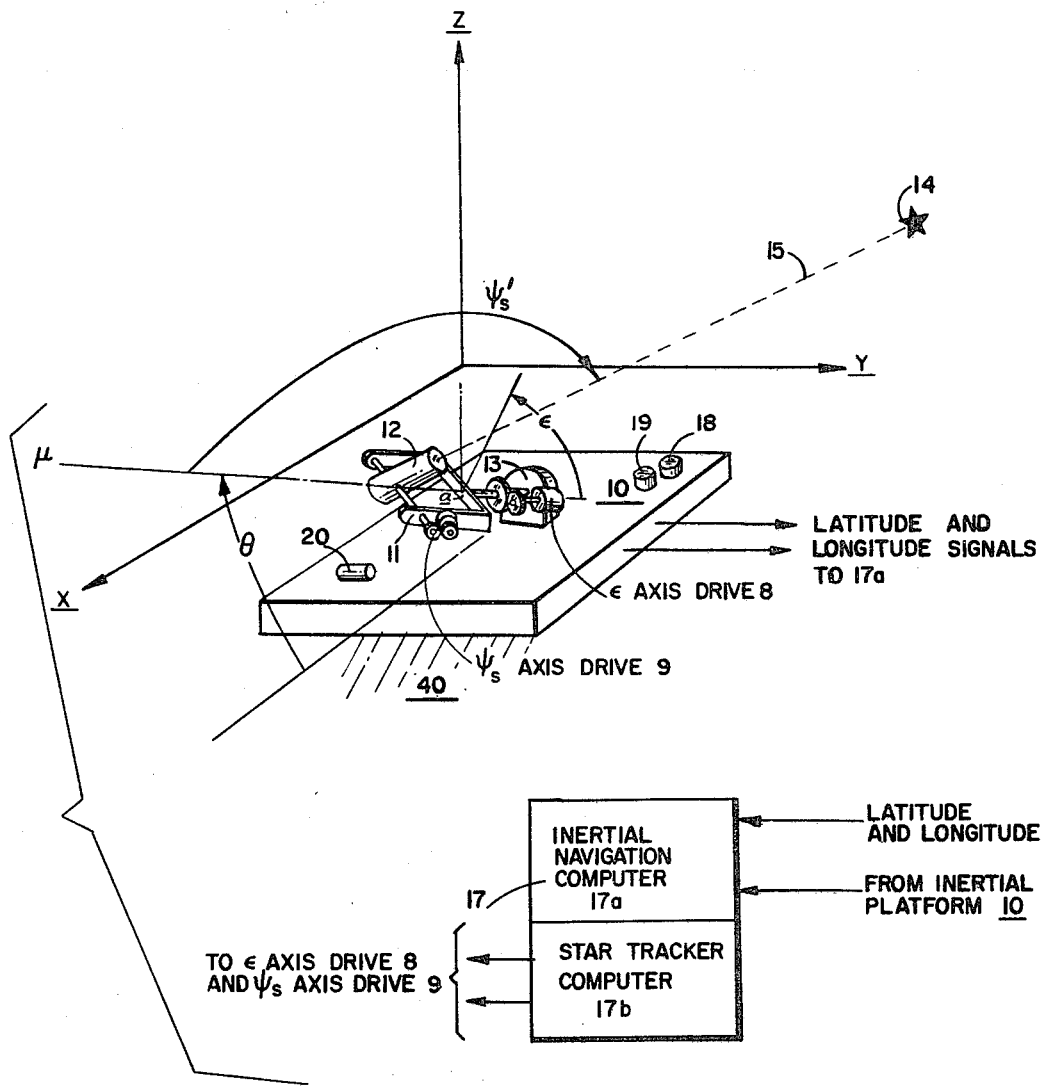
FIG. 3 illustrates a preferred means of mounting the optical monitor telescope to the inertial guidance platform.

In FIG. 3, one possible embodiment of the improved optical monitor mechanization is illustrated. The U-type frame 11 is mounted with a degree-of-freedom about an axis $\mu$ to the platform 10 by mounting bracket 13. The $\epsilon$ axis drive 8 in response to signals from the star tracker computer 17b rotates the frame 11 about the $\mu$ axis. Rotatably mounted to the frame 11 with a degree-of-freedom about an axis perpendicular to the $\mu$ axis is optical telescope 12. The telescope 12 contains a photodetector (not shown) which is narrow in the $\psi_s$ direction and long in the $\epsilon$ direction. The $\psi_s$ axis drive 9 in response to signals from the star tracker computer 17b rotates the telescope 12 about said perpendicular axis and trains the telescope on the preselected star. The axis $\mu$ as previously defined is positioned an angle $\theta$ above the $x$ axis in the $x$–$z$ plane. The guidance computer 17 is comprised of two computer sections: the inertial navigation computer 17a and the star tracker computer 17b. The inertial navigation computer reads out the latitude and longitude position of the platform and provides to the platform mounted gyroscopes proper torquing and biasing signals.

Referring to FIG. 4, the position of the star tracking telescope 12, inertial platform 10 and the guidance computer 17 with respect to the missile 40 is shown. The window 16 allows the telesope 12 to be trained upon the desired star 14 along the line of sight 15.

The improved stellar monitor mechanization described here permits correction of the prelaunch azimuth error, just as the straightforward mechanization did. But the advantage of this mechanization over the straightforward one is that the correlated $x$ and $z$ axis misalignments that are due to $g$-sensitive gyro drifts with gyro optimization are undisturbed. Even more, the improved mechanization insures that all $x$-axis platform misalignments that exist at the time of the star sighting, whether caused by $g$-sensitive gyro drifts or not, give rise to an azimuth correction error whose propagation into missile impact error almost exactly cancels the impact error propagation from the $x$-axis misalignment.

Although the invention has been described and illustrated in detail, it is to be clearly understood that the same is by way of illustration and example only and is not to be taken by way of limitation, the spirit and scope of this invention being limited only by the terms of the appended claims.

I claim:
1. An optical monitor for correcting the impact errors of a missile comprising in combination:
   a stabilized platform mounted to said missile, said platform stabilized about three mutually orthogonal platform axes;
   a telescope;
   means mounting said telescope to said platform with a first degree of freedom about a first axis lying in a plane defined by two of said three orthogonal platform axes, and with a second degree of freedom about a second axis perpendicular to said first axis, said first axis being noncolinear with said two plane defining axes;
   means for angularly positioning said telescope about said first and second axis so as to train said telescope on at least one preselected star; and means responsive to the angular position of said telescope for correcting the impact errors of said missile.

2. An optical monitor for correcting the impact errors of a missile comprising in combination:
- a stabilized platform mounted to said missile, said platform stabilized by gyroscopes about three mutually orthogonal platform axes;
- a telescope;
- means mounting said telescope to said platform with a first degree of freedom about a first axis lying in a plane defined by two of said three orthogonal platform axes, and with a second degree of freedom about a second axis perpendicular to said first axis, said first axis being noncolinear with said two plane defining axes;
- means for angularly positioning said telescope about said first and second axis so as to train said telescope on at least one preselected star; and
- means responsive to the angular position of said telescope applying to said gyroscopes a correcting torque to correct for the alignment errors of said platform with respect to said preselected star and for correcting the impact errors of said missile.

3. An optical monitor for correcting the impact errors of a missile comprising in combination:
- a stabilized platform, said platform stabilized about three mutually orthogonal platform axes;
- a telescope;
- means mounting said telescope with a degree of freedom about a fourth axis non-colinear with said platform axes, and with a second degree of freedom about a fifth axis perpendicular to said non-colinear axis;
- means for angularly positioning said telescope about said fourth and said fifth axes so as to train said telescope on at least one preselected star; and
- means responsive to the angular position of said telescope for correcting the alignment errors of said platform with respect to the position of said star and correcting the impact errors of said missile.

4. The optical monitor as claimed in claim 3 wherein said telescope has a field of view which is long in one plane and narrow in a perpendicular plane.

5. The optical monitor as claimed in claim 4 wherein said long field of view is about an axis perpendicular to said second degree of freedom.

6. A method for correcting the impact errors of a missile, having a stabilized platform and a telescope rotatably mounted thereto, said platform stabilized about a set of axes designated $x$, $y$ and $z$, said method comprising the steps of:
- aligning said telescope along a line of sight to a preselected star by first rotating said telescope by an angle $\epsilon$ about an axis $\mu$, which is substantially along the cutoff velocity vector of said ballistic missile, secondly rotating said telescope by an angle $\psi'_s$ about an axis perpendicular to said $\mu$ axis; and
- comparing the $\psi'_s$ rotation angle and $\psi_s$, the rotation angle at which the preselected star is known to be with respect to the platform, to determine the position and velocity errors of the missile.

7. A method for correcting the impact errors of a missile having an inertial platform mounted therein, said platform stabilized about three platform axes, a telescope rotatably mounted to said platform, said method comprising the steps of:
- rotating said telescope about a first axis substantially along the axis of major vehicle motion in the direction of a preselected star;
- rotating said telescope about a second axis perpendicular to said first axis so as to train said telescope on said preselected star; and
- comparing the angular position of said telescope with respect to said platform and the known angular position of said preselected star with respect to said platform to determine the position and velocity errors of said missile.

References Cited
UNITED STATES PATENTS 2,762,123   9/1956   Schultz et al. _____ 33—1

JAMES W. LAWRENCE, Primary Examiner

V. LAFRANCHI, Assistant Examiner

U.S. Cl. X.R.

33—1; 244—3.18